Figure 5:
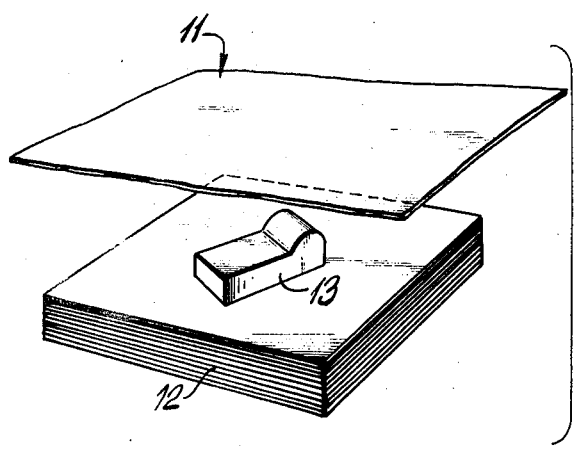

United States Patent [19]

Busby et al.

[11] 4,127,685

[45] Nov. 28, 1978

[54] PROCESS FOR COATING AN OBJECT WITH A CONTINUOUS COATING OF PLASTICS FILM

[75] Inventors: William J. Busby, Tervuren; Piet L. H. Verbunt, Asse, both of Belgium

[73] Assignee: Exxon Research & Engineering Company, Florham Park, N.J.

[21] Appl. No.: 834,527

[22] Filed: Sep. 19, 1977

Related U.S. Application Data

[63] Continuation of Ser. No. 667,496, Mar. 17, 1976, abandoned.

[30] Foreign Application Priority Data

Mar. 21, 1975 [GB] United Kingdom ............... 11935/75

[51] Int. Cl.$^2$ .................... B44D 1/14; B65B 31/02; C08L 23/08

[52] U.S. Cl. .................................. 427/294; 156/86; 53/432; 215/1 C; 215/12 R; 215/DIG. 6; 260/23 H; 260/28.5 AV; 260/31.6; 260/DIG. 15; 427/385 A

[58] Field of Search ............. 53/22 R; 215/1 C, 12 R, 215/DIG. 6; 260/23 H, 28.5 AV, 31.6, DIG. 15, 897 B; 427/294, 295, 296, 385 A, 385 B, 388 A

[56] References Cited

U.S. PATENT DOCUMENTS

| | | | |
|---|---|---|---|
| 2,855,735 | 10/1958 | Groth | 53/30 X |
| 3,048,263 | 8/1962 | Sacks et al. | 260/45.33 |
| 3,048,266 | 8/1962 | Hackhel et al. | 260/45.34 |
| 3,299,195 | 1/1967 | Chenoweth et al. | 53/140 X |
| 3,498,962 | 3/1970 | Bruno | 260/93.7 |
| 3,511,688 | 5/1970 | Brunson | 427/296 |
| 3,932,563 | 1/1976 | Argurio et al. | 260/897 B |
| 3,955,020 | 5/1976 | Cavanagh et al. | 428/35 |

*Primary Examiner*—Michael R. Lusignan
*Attorney, Agent, or Firm*—John J. Mahon

[57] ABSTRACT

An object is coated with a plastics film by a process in which a preformed solid plastics film is brought into contact with an object, the film is stretched over the object and substantially all the film made to adhere substantially permanently to the object. Thus, a tacky plastics film may be held in a frame and the object pushed through the film. Alternatively the object may be conveyed on a moving belt to a position adjacent to a heated plastics film and the film brought into contact with the object. The plastics film may for example be an ethylene-vinyl acetate copolymer.

7 Claims, 10 Drawing Figures

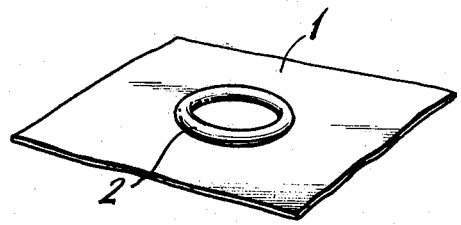
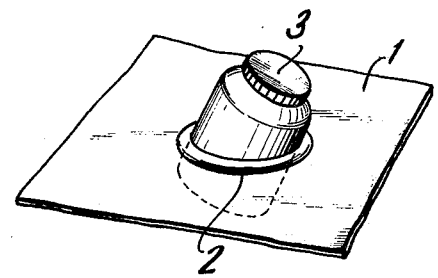
FIG.1  FIG.2
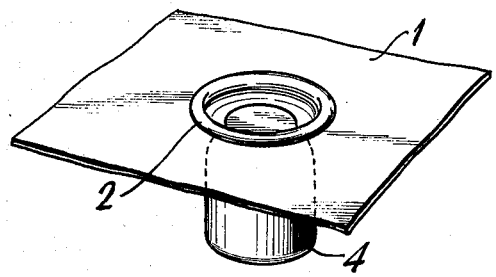
FIG.3
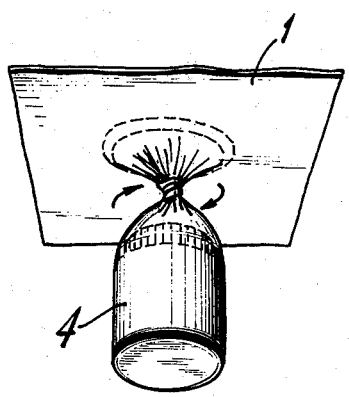
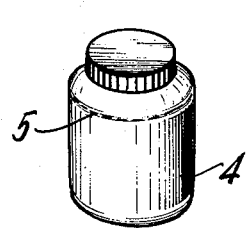
FIG.4a  FIG.4b  FIG.4c U.S. Patent  Nov. 28, 1978  Sheet 2 of 2  4,127,685

PROCESS FOR COATING AN OBJECT WITH A CONTINUOUS COATING OF PLASTICS FILM

This is a continuation of application Ser. No. 667,496, filed Mar. 17, 1976, now abandoned.

This invention relates to the coating of objects such as bottles or cans with a thin preformed film.

Although glass bottles are often printed with the name of the supplier etc. printing on glass objects is not easy or particularly cheap. Another great disadvantage is that glass objects are liable to break when dropped, projecting sharp dangerous process.

We have now found a method whereby objects such as glass bottles, jars, etc. can be coated easily with a thin platics film. The film can be more readily printed than glass with the required information and various other advantages accrue as will be seen from the following description. Flat objects such as glass window panes and metal sheets, can also easily be coated.

According to this invention objects are coated by a plastics film by a process in which a preformed solid plastics film is brought into contact with an object, the film is stretched over the object and substantially all the film made to adhere substantially permanently to the object. In this manner objects are coated with an adhering plastics film which is usually continuous. The object is substantially completely covered by plastics film. The adhesion between film and object is substantially permanent as opposed to objects which are wrapped with a temporary packaging film.

The objects to be coated by this process are manifold, but particularly suitable are glass objects such as glass bottles, glass phials, glass jars and glass window panes. Other objects include plastics and metal containers.

The plastics film can for example be a polyalkylene e.g. polyethylene or polypropylene, ethylene-vinyl acetate copolymer, polyvinyl chloride, polyvinylidene chloride, polystyrene, styrene acrylonitrile copolymers, acrylonitrile butadiene styrene copolymers, ethylene propylene copolymers and terpolymers and polybutadienes.

Other films include those made from random and graft copolymers where one of the monomers is polar including ethylene, acrylic acid, methacrylic acid, acrylate esters, maleic and other anhydrides and inonomeric materials formed by adding metal salts to such copolymers.

Particularly suitable examples of plastics film include the plastics film disclosed and claimed in our U.K. patent specification No. 57680/72 Ser. No: 1401880). This is a transparent self-sealing film made from a composition comprising (i) 90 to 99.95 wt.% of a copolymer of ethylene and a vinyl (or hydrocarbyl substituted) vinyl ester of a $C_1$ to $C_{30}$ monocarboxylic acid containing at least 89 wt.% of ethylene (e.g. ethylene-vinyl copolymer) and (ii) either 0.05 to 10 wt.% of a hydrocarbon resin (i.e. an amorphous hydrocarbon polymer having an average number MW of not more than 3000), or 0.05 to 5 wt.% of liquid polyisobutene or liquid polybutene or a combination of 0.05 to 10 wt.% of the hydrocarbon resin and 0.05 to 5 wt.% of the polyisobutene or polybutene, provided the combined weight of the resin and polyisobutene or polybutene is not more than 10 wt.%. Thus, a particular example is a film made from a composition 99 wt.% of an ethylene-vinyl acetate copolymer containing 10 wt.% vinyl acetate and 1 wt.% of a liquid polyisobutene rubber (viscosity average MW of 30,000–50,000).

Another example of a suitable plastics film is that described and claimed in our copending U.S. application Ser. No. 509,228. This is a self-sealing film made from a composition comprising (i) 90–99.95 wt.% of a copolymer of ethylene and a vinyl (or hydrocarby substituted vinyl) ester of a $C_1$–$C_{30}$ monocarboxylic acid, (ii) either 0.05 to 10 wt.% of a hydrocarbon resin, or 0.05 to 5 wt.% of polybutene or polyisobutene or a combination of 0.05 to 10 wt.% of the hydrocarbon resin and 0.05 to 5 wt.% of polybutene or polyisobutene provided the combined weight of the resin and polybutene or polyisobutene is not more than 10 wt.% and (iii) 0.01 to 3.0 wt.% based on the combined weight of (i) and (ii) of a partial carboxylic acid ester of a polyol (e.g. sorbitan monolaurate).

Thus a particular example is a film made from a composition comprising 96.2 wt.% of an ethylene-vinyl acetate copolymer containing 95 wt.% of ethylene, 3 wt.% of hydrogenated polycyclopentadiene resin and 0.8 wt.% of sorbitan monolaurate.

The specification of our U.S. application Ser. No. 585,882 described a further example of suitable plastics films. Such films are self-sealing films comprising (i) 95.0 to 99.9 wt.% of either a copolymer of ethylene and a vinyl (or hydrocarbyl substituted vinyl) ester of a $C_1$–$C_{30}$ monocarboxylic acid, said copolymer containing 0.10 to 1.95 wt.% of the vinyl (or hydrocarbyl substituted vinyl) ester (e.g. ethylene-vinyl acetate copolymer) or 95.0 to 99.9 wt.% of a mixture of a thermoplastic polyolefin and a copolymer of ethylene and a vinyl (or hydrocarbyl substituted vinyl) ester of a $C_1$–$C_{30}$ monocarboxylic acid, the proportion of polymerised vinyl (or hydrocarbyl substituted vinyl) ester in the mixture being from 0.10 to 1.95 wt.% and (ii) 0.01 to 5.0 wt.%. of a partial ester of a carboxylic acid and a polyol. Thus, a particular example of such films is a film made from a mixture comprising 62.5 wt.% of a homopolymer of ethylene, 36.0 wt.% of an ethylene vinyl acetate copolymer containing 5 wt.% of vinyl acetate and 1.5 wt.% of sorbitan monolaurate.

Also the specification of our U.S. application Ser. No. 585,743 describes a further example of suitable plastics films. Such films are self-sealing films made from compositions comprising (i) 85 to 99.8 wt.% of a thermoplastic polyolefin (ii) 0.1 to 10.0 wt.% of a partial ester of a carboxylic acid and a polyol and (iii) either 0.1 to 10 wt.% of a hydrogenated hydrocarbon resin or 0.1 to 10 wt.% of polybutene or polyisobutene, provided the combined weights of (ii) and (iii) is not more than 15 wt.%. Thus, a particular example is a film made from a composition comprising 98.5% of an ethylene homopolymer, 1.0 wt.% of sorbitan monolaurate and 0.5 wt.% polyisobutene.

Another example of such a film is made from suspension PVC powder. A formulation suitable for blown film comprises 100 parts by weight of PVC, 10–20, e.g. 15 parts by weight of plasticizer such as dioctyl adipate (DOA), 5–15 e.g. 10 parts by weight of epoxidized soya bean oil and 0 to 5 parts by weight of a lubricant such as stearic acid or a glyceride.

Films made from polar copolymers and ionomers are particularly advantageous when heat is used in the coating process as the polar character enhances the adhesion to many substrates.

These films are normally made by blowing a tube but can also be made by casting onto a chill roll or into water. More details are given in Chapter 9 "The Processing of Crystalline Olefin Polymers," Part II, 1964 Raff. and DOAK by Interscience Publishers.

These plastics films can be of different thicknesses but suitable films are for example those of 5–20 microns, e.g. 10–15 microns thickness. If the main purpose of the coating is to make a bottle shatterproof, thicker films would be used.

The degree of stretching of the film varies with the particular film and objects and method used.

One suitable method of coating an object is to hold a tacky plastics film in a frame and push the object through the film. Afterwards the film may be trimmed to the desired shape. Thus for example, a bottle such as a lemonade bottle can be coated by holding a tacky plastics film in a circular frame, pushing the bottle bottom first through the film and thereafter cutting the film so that it terminates at the top edge of the neck of the bottle. When the film is cut near the neck of the bottle it retracts due to the tension acquired by the film when pushing the bottle through the film. As an alternative the film may be cut near the neck and heat shrunk to a tight fit. Heat shrinking also increases the adhesion between the film and the bottle. In this method the film is usually stretched linearly to between 200 and 400%.

As another alternative the plastics film may be cut to a suitable shape and the end of the cut film twisted over the top of an already filled bottle, jar, etc. Using coloured or decorated films, this is a very economical way of improving the appearance of a package.

Another suitable method of coating the object relies on obtaining the desired surface and mechanical properties in the plastics film by heating the film. The coefficient of friction, the stress-strain characteristics, and the adhesion to the object are all altered by heating the film before contacting the object to be coated. Plastics films which are heated are more tacky, more extensible and adhere better to the object and even more so if the object is also heated. To operate this method the object can be conveyed on a moving belt to a position adjacent to, and preferably beneath, a plastics film. The plastics film is heated to give the required properties. Optionally the object itself can also be heated. The film is then brought into contact with the object. Excess film can then be removed. This sequence can be repeated by removing waste plastics film and coated object and replacing these with the new plastics film and object. In this method the film is usually stretched linearly to between 20 and 50%.

The temperature to which the films or object is heated varies widely with the particular film and the time involved in the process. Normally the film remains below its melting point (e.g. 20°–50° C. below) until it has coated the object properly. Thus for polyethylene having a melting point of about 100° C. the film is heated to about 80° C.

Either of the two above-mentioned methods can be modified by applying a vacuum (reduced pressure) below the film or a pressure above the film so as to force the film into contact with the object to be coated. This modification is advantageous for processes where several objects are to be coated in each operation.

Any of these methods can be modified further by the use of coextruded films for the coating operation. In this manner the surface characteristics needed for the coating operation can be controlled independently from the properties of the exposed outside surface. Thus, the outside layer can be made with a low coefficient of friction by incorporating a slip additive, or it can be made from a coloured material.

Although the invention has been described with details for 3 dimensional objects, it is also suitable for flat objects such as plate glass, metal sheeting. Here again the ability to give a decorated, attractive, protective coating is often a great advantage.

By the process of the invention the following advantages are obtained:

(i) the film can be more easily and more attractively printed than for example a glass bottle
(ii) glass objects such as bottles are protected during transport, preventing scratches which cause breakage due to the notch sensitivity of glass
(iii) should the object, e.g. a glass bottle or glass pane, break the plastic film is not usually ruptured and this reduces the possibility of flying or dangerous glass fragments
(iv) a plastics coated bottle makes much less noise during transit than the normal glass bottle The invention is now illustrated with reference to the accompanying drawings in which FIGS. 1–4c show the sequence of operations where a frame is used to hold the film and FIGS. 5–8 show the sequence of operations where a heated film is used.

Referring to FIG. 1 in sequence 1 the preformed plastics film is held in a rigid clamping device 2. In FIG. 2 a bottle 3 is moved down into the film 2. This movement is continued in FIG. 3 until the bottle is coated up to the neck with plastics film. FIG. 4 shows three alternative ways of finishing the film coatings. In FIG. 4a the film 4 is cut at the clamping ring and twisted. In FIG. 4b the film is cut at the neck (5) with a rotating knife. In FIG. 4c the film is cut at the neck with a hot wire and heat shrunk to give a neat finish.

Figure 7:
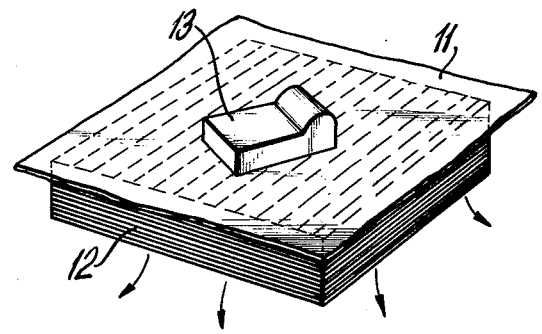
Figure 6:
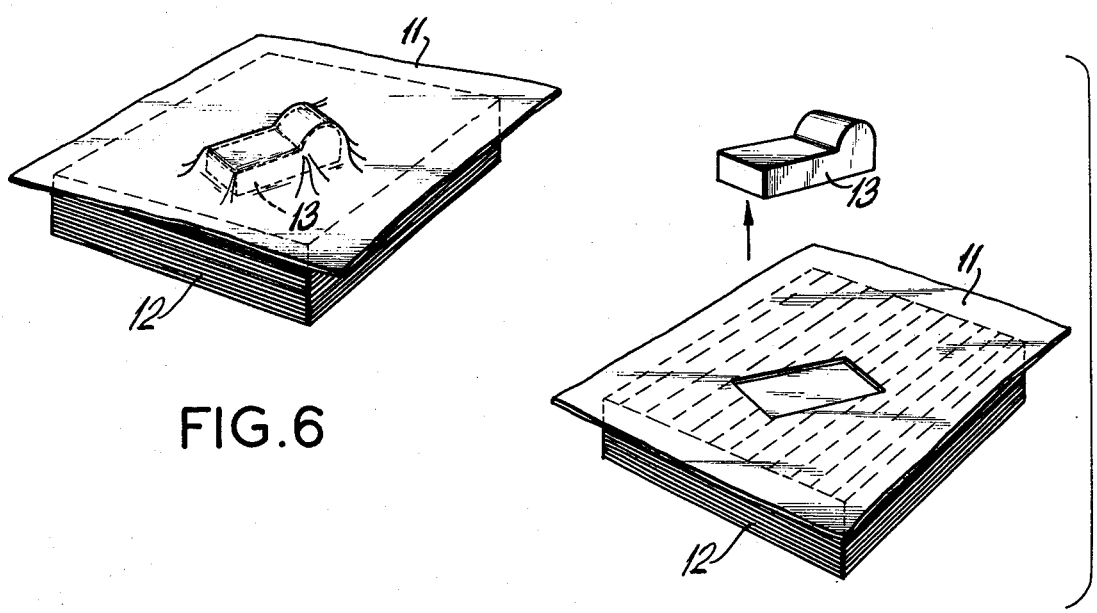
Figure 8:
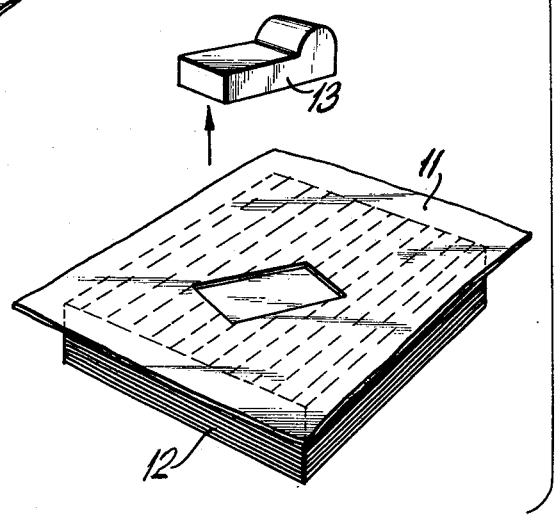

Referring to FIGS. 5–8 in FIG. 5 a plastics film 11 is heated to make it soft and tacky. In FIG. 7 an object 13 supported on a porous plate 12 is brought into contact with the tacky plastics film 11. In FIG. 6 vacuum is applied on the porous plate 12 and this causes the tacky film 11 to adhere firmly to the object 13. Finally in FIG. 8 the coated object 13 is cut away from the film 11.

What is claimed is:

1. A process for coating an object with a continuous coating of plastics film which consists of a pre-formed solid self-sealing tacky plastics film being brought into contact with an object, the film is stretched over the object and substantially all of the film made to adhere substantially permanently to the object, the film being made from a composition selected from the group consisting of:

(a) A composition comprising (i) 90 to 99.95 wt.% of a copolymer of ethylene and a vinyl (or hydrocarbyl substituted vinyl) ester of a $C_1$ to $C_{30}$ monocarboxylic acid containing at least 89 wt.% of ethylene and either 0.05 to 10 wt.% of an amorphous hydrocarbon polymer having an average number molecular weight of not more than 3000 or 0.05 to 5 wt.% of liquid polyisobutylene or liquid polybutene or a combination of 0.05 to 10 wt.% of the hydrocarbon polymer and 0.05 to 5 wt.% of the polyisobutene or polybutene, provided the combined weight of hydrocarbon polymer and polyisobutene or polybutene is not more than 10 wt.%;

(b) A composition comprising (i) 90 to 99.95 wt.% of a copolymer of ethylene and a vinyl (or hydrocarbyl substituted vinyl) ester of a $C_1$ to $C_{30}$ monocarboxylic acid (ii) either 0.05 to 10 wt.% of a hydrocarbon resin, or 0.05 to 5 wt.% of polybutene or polyisobutene or a combination of 0.05 to 10 wt.% of the hydrocarbon resin and 0.05 to 5 wt.% of polybutene or polyisobutene or a combination of 0.05 to 10 wt.% of the hydrocarbon resin and 0.05 to 5 wt.% of polybutene or polyisobutene provided the combined weight of the resin and polybutene or polyisobutene is not more than 10 wt.% and (iii) 0.01 to 3.0 wt.% based on the combined weight of (i) and (ii) of a partial carboxylic acid ester of a polyol;

(c) A composition comprising (i) 95.0 to 99.9 wt.% of either a copolymer of ethylene and a vinyl (or hydrocarbyl substituted vinyl) ester of a $C_1$ to $C_{30}$ monocarboxylic acid, said copolymer containing 0.10 to 1.95 wt.% of the vinyl (or hydrocarbyl substituted vinyl) ester of 95.0 to 99.9 wt.% of a mixture of a thermoplastic polyolefin and a copolymer of ethylene and a vinyl (or hydrocarbyl substituted vinyl) ester of a $C_1$ to $C_{30}$ monocarboxylic acid, the proportion of polymerised vinyl (or hydrocarbyl substituted vinyl) ester in the mixture being from 0.10 to 1.95 wt.% and (ii) 0.01 to 5.0 wt.% of a partial ester of a carboxylic acid and a polyol;

(d) A composition comprising (i) 85 to 99.8 wt.% of a thermoplastic polyolefin (ii) 0.1 to 10.0 wt.% of a partial ester of a carboxylic acid and a polyol and (iii) either 0.1 to 10 wt.% of a hydrogenated hydrocarbon resin or 0.1 to 10 wt.% of polybutene or polyisobutene, provided the combined weights of (ii) and (iii) is not more than 15 wt.%; and (e) A composition comprising 100 parts by weight of PVC, 10–20 parts by weight of plasticizer, 5–15 parts by weight of epoxidized soya bean oil and 0 to 5 parts by weight of a lubricant.

2. A process according to claim 1 which comprises holding a tacky plastics film in a frame and pushing the object through the film.

3. A process according to claim 2 wherein the object is a bottle and after the bottle has been pushed through the film, the film is cut near the neck and heat shrunk to a tight fit.

4. A process according to claim 1 wherein the object is conveyed on a moving belt to a position adjacent to a heated plastics film and the film is brought into contact with the object.

5. A process according to claim 4 wherein the moving belt is positioned beneath the plastics film.

6. A process according to claim 4 wherein the object is heated.

7. A process according to claim 4 wherein a vacuum is applied below the film or a pressure is applied above the film.

* * * * *